May 3, 1932. R. A. JUMONVILLE 1,856,957
VARIABLE LIFT WING
Filed Nov. 19, 1930 2 Sheets-Sheet 1
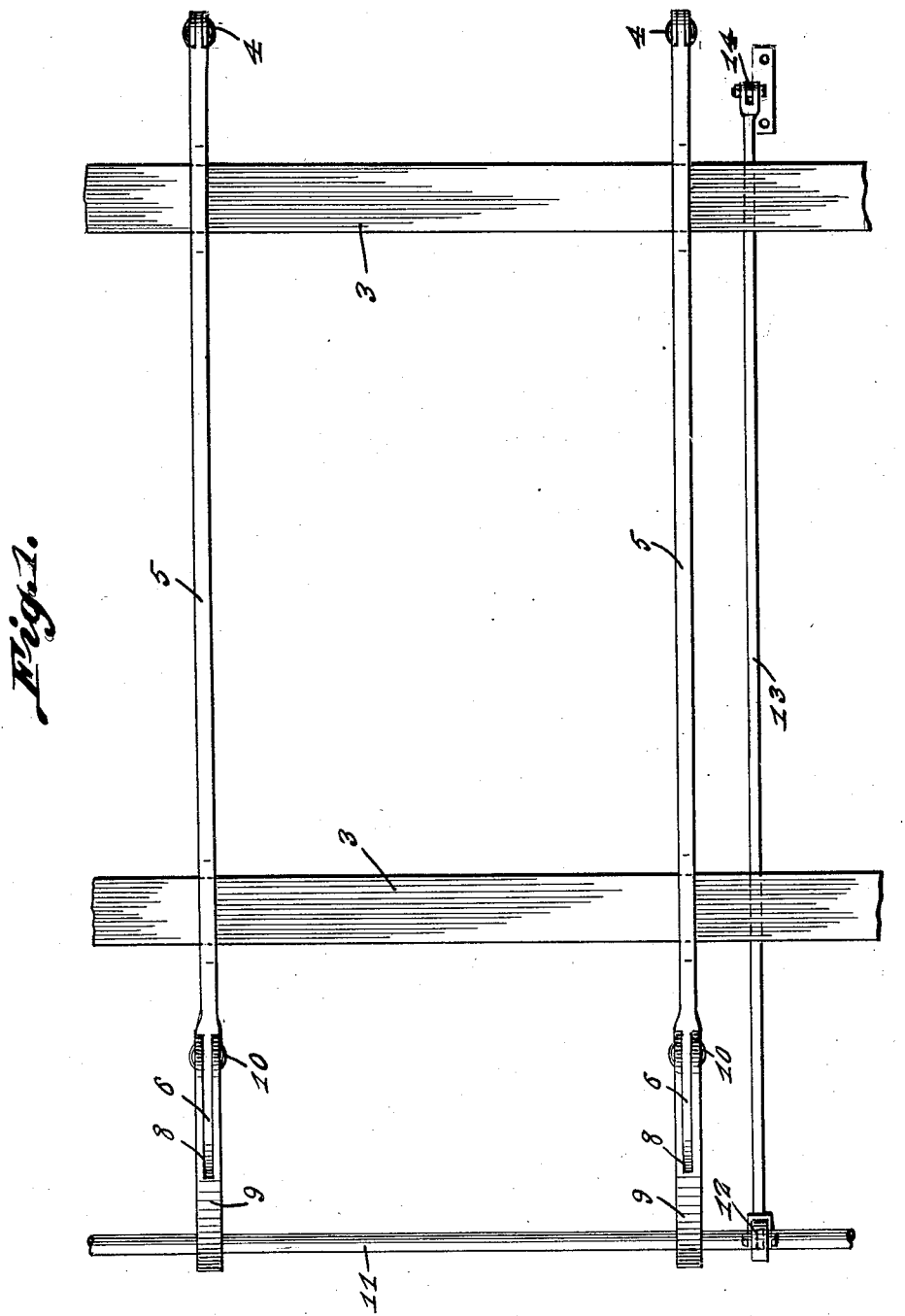

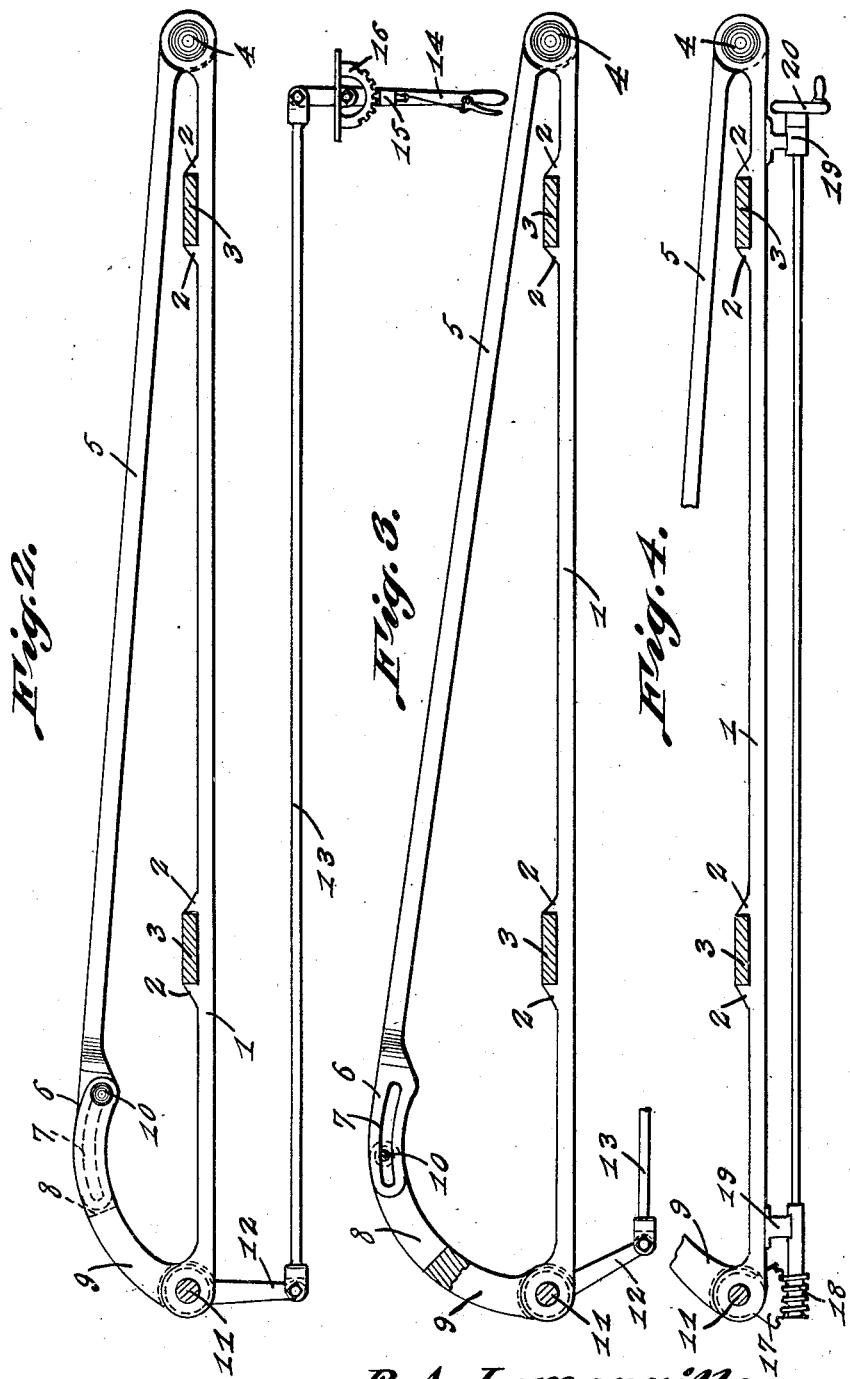

Patented May 3, 1932

1,856,957

UNITED STATES PATENT OFFICE

RUSSELL ANDREW JUMONVILLE, OF NEW ORLEANS, LOUISIANA

VARIABLE LIFT WING

Application filed November 19, 1930. Serial No. 496,700.

My invention has reference to wings for aeroplanes, and has for its object to increase the efficiency of a regular aeroplane wing by changing the air foil curve from a high speed and low lift curve to a very low speed and high lift curve to cause more or less vacuum, more lifting power which enables the plane to function correctly and which also insures the stability and ease in the landing of the plane.

A further object is the provision of a variable lift wing rib for aeroplanes whereby the thickness of the wing may be decreased or dinimished in an easy and efficient manner so that the plane equipped with the wing will have a low landing speed when the top of the wing is raised to give maximum lift or have a high top speed when the top is lowered to give the smallest amount of resistance.

To the attainment of the foregoing the invention consists in the improvement hereinafter described and definitely claimed.

In the drawings:

Figure 1 is a plan view of the improvement.

Figure 2 is a sectional view approximately on the line 2—2 of Figure 1, the wing being in lowered position.

Figure 3 is a similar view with the wing in its raised or elevated position.

Figure 4 is a view to illustrate a second form of control.

As my improvement relates to the wing frame structure of an aeroplane the covering therefor is not illustrated by the drawings. The covering is of the desired suitable material, while not necessarily flexible may be of canvas with a telescoping leading edge or the same may be of metal with a telescoping leading edge.

The improvement comprises any desired number of ribs, the lower ribs indicated by the numeral 1, provided adjacent to their front and rear with pairs of spaced upstanding lugs 2 which receive therebetween and have fixed thereto the spars 3. To the rear end of each of the lower ribs 1 there is pivotally secured, as at 4, the longer member 5 of the upper ribs. The upper ribs are at all times arranged at an inclination with respect to the ribs and the forward and front ends of the rib sections 5 are reduced from the opposite sides thereof, arched, as at 6, and slotted, as at 7. The ends 6 of the rib sections 5 are designed to be received in slots or notches 8 in the curved or arched front rib sections 9. A pin 10 passes through the ends 8 of the short arched front rib sections and through the slot 7 of the rib sections 5, while a shaft 11 passes through bearing openings at the front of the lower ribs 2 and through the ends of the short arched rib sections 9. The rib sections 9 are fixed to the shaft, while the shaft is rotatable in the lower ribs 1. The shaft has fixed thereon an arm or clamp 12 to which is connected a rod 13 that leads to the cockpit of the aeroplane. The rear end of the rod 13 is pivotally secured to a depending lever 14, the said lever being provided with a spring influenced hand operated dog 15 which engages between the teeth of an arched rack 16 that is suitably fixed in the machine in close proximity to the driver's seat in the cockpit. It will be apparent that by swinging the lever the upper rib sections will be moved one on the other to vary the thickness of the wing. A quick adjustment of the wing is obtained by the employment of the lever, dog and rack, but this adjustment may not be accurate and, therefore, I may if desired fix on the shaft a toothed segment 17 that is engaged by a worm 18 fixed on one end of the shaft which is journaled in suitable bearings 19 on one of the lower ribs, the rear end of the shaft having fixed thereon a hand wheel 20 that is provided with a suitable operating handle, and which is arranged in close proximity to the seat of the driver in the cockpit.

With a variable lift wing structure as herein set forth an aeroplane is enabled to take off quicker by increasing the wing thickness. Speed may be obtained when the thickness is reduced. High speed planes may land at a lower rate of speed when the thickness is increased. Propeller torque may be counteracted by setting wing opposite the rotation of the propeller thicker than the other. The improvement may be used for gliders in gaining speed and sufficient power to enable the gliders to obtain more climbing ability.

As is well known the taking off of a plane from the ground is a difficult task, whether the planes be of a racing or load carrying character but with the employment of my wing construction the wing when increased in thickness causes more vacuum and gives more lifting power which enables the plane to function correctly. After the plane has gained enough altitude speed is desired. To gain speed in an aeroplane it is essential to overcome wind resistance as much as possible, and this is accomplished by the pilot decreasing the thickness of the wing to a point where the least resistance possible is obtained and which causes the plane to move faster.

Racing planes or planes carrying heavy loads, have a very high landing speed to give the plane more stability. To avoid this, it is essential that the plane have more lifting power that causes resistance, which tends to keep the plane more stable at a lower rate of speed. With my type of wing the thickness may be increased until enough stability is obtained by giving the plane more lifting power.

Torque is the force created by the propeller and which tends to move the aeroplane in an opposite direction to its own movement, generally counteracted by warping the wing opposite the rotation of the propeller. With my type of wing instead of warping the wing, one side of the wing may be set thicker than the other, until the point is reached where the propeller torque is counteracted.

For a glider to gain altitude, it must also gain speed and power. To do this the glider must descend and then ascend quickly. With my type of wing the thickness may be reduced to the point where little resistance will be caused while descending and naturally give more speed and power so that the glider can climb quicker when the thickness of the wing is increased to the point where more lifting power is obtained.

While in the drawings I have illustrated single means located at one end for swinging the sections 9 to increase or decrease all of the upper ribs, it is obvious that two or more of such controlled devices may be employed so that the thickness of the wing may be varied at different points throughout its length.

Having described the invention, I claim:

1. An aeroplane wing, comprising lower and upper ribs which have their ends pivotally connected, struts spacing the lower ribs, each of the upper ribs comprising a front and a rear section, the rear section being straight and long and having its free end widened, curved and slotted, each of the front upper rib sections being short, arched and having their free ends slotted to receive the reduced free ends of the rear rib sections therein, pivots passing through the slotted ends of the front sections to be received in the slots of the rear rib sections, means for sliding the ends of the rib sections one on the other to bring the upper rib sections toward or away from the lower rib sections to increase or decrease the thickness of the wing, and means for locking the upper rib sections adjusted.

2. An aeroplane wing, comprising lower and upper ribs which have their ends pivotally connected, struts spacing the lower ribs, each of the upper ribs comprising a front and a rear section, the rear section being straight and long and having its free end widened, curved and slotted, each of the front upper rib sections being short, arched and having their free ends slotted to receive the reduced free ends of the rear rib sections therein, pivots passing through the slotted ends of the front sections to be received in the slots of the rear rib sections, means for sliding the ends of the rib sections one on the other to bring the upper rib sections toward or away from the lower rib sections to increase or decrease the thickness of the wing, and means for locking the upper rib sections adjusted, the pivots for the front of the ribs being in the nature of a shaft, means for turning the shaft and means for holding the shaft from turning.

In testimony whereof I affix my signature.

RUSSELL ANDREW JUMONVILLE.